(12) United States Patent
Carper et al.

(10) Patent No.: US 6,480,935 B1
(45) Date of Patent: Nov. 12, 2002

(54) SMART CARD MEMORY MANAGEMENT SYSTEM AND METHOD

(76) Inventors: Todd Carper, 19672 Stevens Creek Blvd., Cupertino, CA (US) 95014; David Hemmo, 12 Rue Caillaux, 75013 Paris (FR)

( * ) Notice: Subject to any disclaimer, the term of this patent is extended or adjusted under 35 U.S.C. 154(b) by 0 days.

(21) Appl. No.: 09/386,286

(22) Filed: Aug. 31, 1999

Related U.S. Application Data

(60) Provisional application No. 60/116,243, filed on Jan. 15, 1999.

(51) Int. Cl.[7] .............................. G06F 12/02; G06K 5/00; G06K 19/06
(52) U.S. Cl. ..................... 711/115; 711/102; 711/104; 235/380; 235/492
(58) Field of Search ................................ 711/115, 100, 711/102, 103, 104; 235/380, 490, 492, 487; 714/8

(56) References Cited

U.S. PATENT DOCUMENTS

| 4,882,474 A | | 11/1989 | Andrei et al. ................ 235/380 |
| 5,408,082 A | * | 4/1995 | Takagi et al. ................. 235/380 |
| 5,740,349 A | | 4/1998 | Hasbun et al. .................. 714/8 |
| 5,811,770 A | * | 9/1998 | Bonnemoy .................... 235/380 |
| 5,857,024 A | * | 1/1999 | Nishino et al. ............... 235/380 |
| 6,272,607 B1 | * | 8/2001 | Baentsch et al. .............. 235/492 |
| 6,338,435 B1 | * | 1/2002 | Carper ........................ 235/487 |

FOREIGN PATENT DOCUMENTS

EP        0 292 248        11/1988

OTHER PUBLICATIONS

Rankl et al., "Smart Card Handbook." (John Wiley & Sons, 1998), pp. 14,91,103,107–110, 127–128.
Guthery et al., "Smart Card Developer's Kit" (Inianapolis: Macmillian Technical Publishin 1998) pp. 175–176, 219–220.
International Search Report for PCT/US00/00080 (related PCT application) dated May 25, 2000.

* cited by examiner

Primary Examiner—Matthew Kim
Assistant Examiner—Brian R. Peugh (57) ABSTRACT

A system and method for memory management in a smart card are disclosed. The memory manager, preferably part of a true operating system, is the single device by which memory in the smart card is allocated and deallocated. Memory allocation for new data objects and memory deallocation as the result of data object deletion are made by reference to a memory management record, preferably a bitmap, which is stored in RAM and formed upon smart card initialization.

28 Claims, 7 Drawing Sheets

| SIZE (IN BYTES) | FIELD |
|---|---|
| 2 | ID |
| 1 | OWNERSHIP |
| 1 | TYPE |
| 4 | DATA |
| 2 | LENGTH |
| 6 | LABEL |

SMART CARD MEMORY MANAGEMENT SYSTEM AND METHOD

CROSS REFERENCE TO RELATED APPLICATION(S)

This application claims the benefit of U.S. Provisional Application No. 60/116,243 filed Jan. 15, 1999.

FIELD OF THE INVENTION

The present invention relates to the field of portable tokens, such as smart cards. More particularly, the present invention relates to a management system and method for memory in a smart card.

BACKGROUND OF THE INVENTION

Smart cards are increasingly used in financial and commercial transactions in the place of credit/debit cards and stored value cards. Rather than employing information encoded on a magnetic strip, smart cards include a microprocessor with a memory element embedded within a some physical form. With a microprocessor, smart cards interact with terminals across a broader range of transactions and are able to communicate a broader and a more detailed range information regarding the cardholder, a cardholder account, transaction authorization, or other information.

Figure 1:
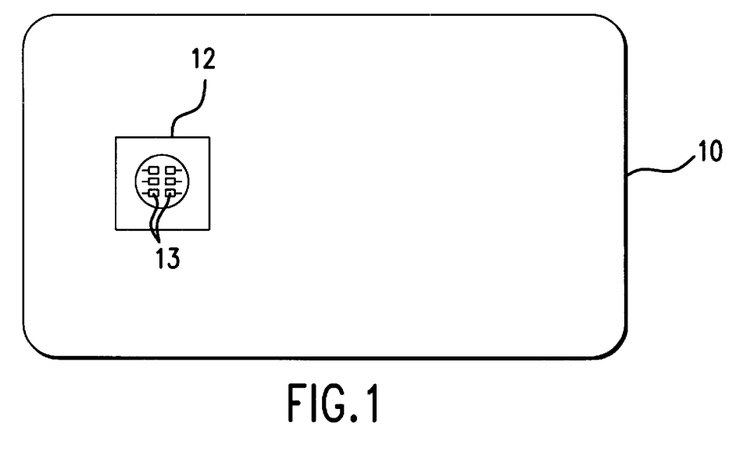
FIG. 1 illustrates an exemplary conventional smart card.

FIG. 1 shows an exemplary smart card 10. Rougly the size of a credit card, smart card 10 includes a microprocessor 12 with an integral memory element and conductive contacts 13. Microprocessor 12 is typically a single wafer integrated circuit (IC) mounted on, or embedded within the otherwise plastic smart card. Conductive contacts 13 interface with a terminal to electrically transfer data between the terminal and the smart card. Other smart card embodiments do not include conductive contacts 13. Such "contactless" smart cards receive information via proximately coupling, such as magnetic coupling, or via remote coupling, such as radio communication.

Figure 2:
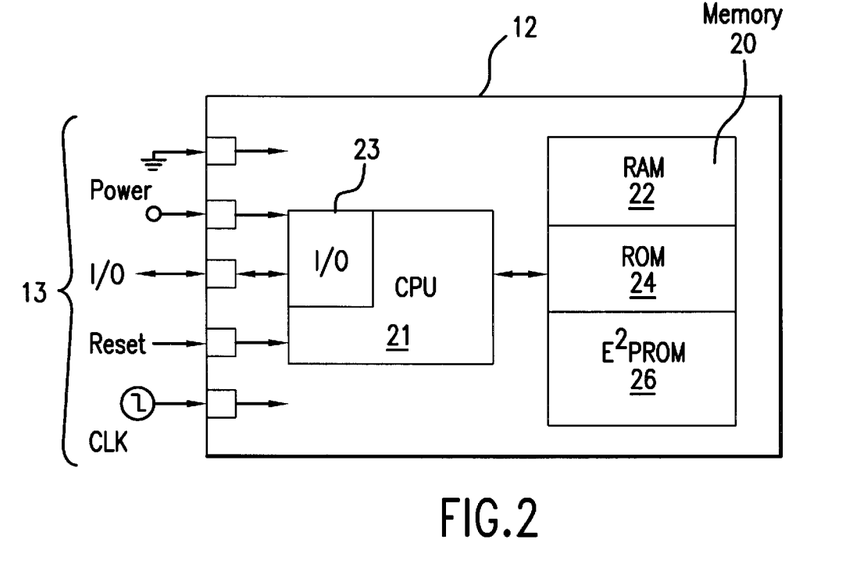
FIG. 2 illustrates the integrated circuit portion of the conventional smart card is some additional detail.

The microprocessor 12 and conductive contacts 13 of FIG. 1, are shown in some additional detail in FIG. 2. Conductive contacts variously include power contacts, at least one input/output (I/O) port, a reset port, and a clock (clk) signal port. Microprocessor 12 comprises a central processing unit (CPU) 21 which is generically control logic including I/O circuitry 23. Terminal signals variously interface with CPU 21 through the conductive contacts 13 and I/O circuitry 23. Microprocessor 12 further comprises a memory element 20, typically including Random Access Memory (RAM) 22, Read Only Memory (ROM) 24, and Electrically Erasable Programable Read Only Memory (EEPROM) 26.

Operating power, a user input keypad, and a display for the smart card microprocessor are provided by the terminal; i.e., an ATM, merchant point-of-sale device, or security control device, etc. The terminal includes a mechanism detecting the presence of a properly positioned smart card. Upon detecting the smart card, the terminal provides power to the microprocessor, and typically sends a reset (RST) signal to the smart card. The smart card uses the RST signal to reset itself or to initiate an internal reset function. After reset, the smart card returns an answer-to-reset (ATR) signal to the terminal. The ATR signal communicates basic information concerning the smart card to the terminal. Once such basic information is successfully recognized by the terminal, communication, i.e., data transfer, between the smart card and the terminal can be established.

In addition to operating as ATM cards, credit/debit cards and stored value cards, smart cards can be designed to operate as personal identity cards, critical record storage devices, security IDs, etc. In these varied capacities, a smart card may be designed to perform any number, or any combination of data processing functions including, access, storage, transfer, exchange, authorization, etc.

As smart cards are pressed into service to support an increasingly broad range of applications, the demands placed on the smart cards' memory system increase dramatically. Conventional smart cards have not required true memory management since memory system performance expectations have been very modest. However, if smart cards are to realize their full potential of running a number of independently developed and controlled applications on a single card, an effective, secure memory management system must be implemented.

In early examples of conventional smart cards, an application was stored in ROM and run as an embedded application directly on the microprocessor. Later examples of conventional smart cards incorporated an interpreter in ROM and/or allowed applications to be written into EPROM. In any of these configurations, the conventional smart card memory was accessed and manipulated by any and all applications and/or interpreters running on the smart card. The security problems associated with multiple programs accessing the same memory space are one factor historically militating against the use of multiple applications on a single smart card, particularly multiple applications from different vendors.

Thus, conventional smart cards have rarely been required to truly "manage" their memory space. Some static or even movable boundaries between segments of memory have been used but such boundaries effect only the most primitive aspects of memory allocation.

European patent document 0 292 248 discloses one conventional smart card memory management technique. Here, a so-called "operating system," is stored in ROM, and a movable boundary separates a write only portion of EPROM storing applications from a read/write portion of EPROM storing other data types.

Such macro-partitioning of EPROM between data types, or between individual applications is common in conventional smart cards. Often, the partitioning creates a fixed memory queue in which one application is written behind the next until the queue is full. Once the queue is full no additional programs may be loaded onto the smart card.

SUMMARY OF THE INVENTION

The present invention provides a single memory manager, preferably part of a true operating system (OS), through which smart card memory is allocated and deallocated. Since all requests for smart card memory definition (allocation and deallocation) are controlled by the memory manager, memory integrity and security are assured.

Since memory allocation may be made dynamically on an as-needed basis, the smart card memory may be efficiently used, and need not be pre-allocated or defined by arbitrary boundaries.

In allocating and deallocating memory space, the memory manager references a memory management record, typically a bitmap or similar record. During smart card operation, the memory management record is preferably stored in RAM. Accordingly, the memory management record must be recreated in RAM upon smart card initialization. This may be done by recopying a copy of the memory management record previously stored in non-volatile memory by a previous transaction ending in a controlled shut-down, or by poling a file directory stored in non-volatile memory following a transaction ending in an uncontrolled shut-down.

The memory management record may include a broad array of information relating memory to various data objects stored in memory. Primarily, however, it indicates memory availability.

The present invention makes full use of a predictable data record format and an efficient file directory structure. While subject to variation and programmer definition, the data record format provides a basis by which the memory management record may be recreated upon smart card initialization by interrogation of the various data object stored in read/write memory. The file directory is flexible and able to accurately identify all data objects persistent in read/write memory, while occupying a minimum of memory space itself.

A file manager, also preferred as part of the OS, is used to access data records in the file directory. Together with the memory manager, the file manager allows read/write memory to be efficiently allocated and deallocated. Read/write memory space may, in fact, be recycled once a former data object is no longer needed.

Thus, the present invention in it multiple aspects provides a system and method by which memory in a smart card is securely and effectively used, as between multiple applications running on the smart card.

DETAILED DESCRIPTION

The present invention provides a single manager for all memory space on a smart card. Every request for the allocation or deallocation of memory space, whether made by an operating system or by an application, is made through this single memory manager. No other agent can access or define memory space on the smart card.

Preferably, the code implementing the memory management capabilities, amongst others capabilities, is resident in the smart card operating system (OS). The OS is preferably stored in ROM, but may be stored, wholly or in part in read/write memory. The OS is a "true" OS in the sense that it does not execute any command received from a terminal. Rather, the OS provides an I/O routine by which commands are transferred from the terminal to an application running on the smart card, and provides a number of functions which may be called by any one of the smart card applications. The term "function," as used in the context of OS capabilities, denotes a set of related operational functions, instructions, processes, and/or definitions which have been conveniently grouped or identified together according to their nature or operational relationships.

The memory manager of the present invention is preferably one such OS function. The term "memory manager" is used to denote the code providing at least the memory allocation, deallocation, and accounting capabilities discussed in greater detail below. The memory manager manages all data stored in read/write memory and RAM, including, as examples, scratch pad data, file/record data, and applications. The term "read/write memory" is used to generically refer to those forms of memory into which data may be written and read. All forms of electrically programmable read only memory (EPROM) and flash memory are contemplated by the term read/write memory.

The single memory manager of the present invention implements a flexible, controlled memory access capability for the OS and all applications on the smart card at the lowest level of read/write memory. By use of the single memory manager, applications are stored in efficiently allocated memory space. There are no requirements for memory space to be pre-allocated to an application when it is installed, as is often the case with conventional smart cars. In fact, with the exception of a very limited set of global data objects, the entirety of read/write memory may be used by the memory manager to dynamically store records, files and data objects for the operating system and the applications on the smart card.

Memory allocation is made by the memory manager on an "as needed" basis, such that records, files, and data objects are stored in a minimum of memory space. When the OS or an application requires a block of memory, it requests the desired amount from the memory manager. The memory manager identifies and allocates the smallest available block of read/write memory capable of satisfying the request. This process reduces memory space fragmentation and allows optimal use of the memory space.

Effective memory management requires a reference. At any given moment, the reference must accurately indicate which portions of memory are in use and which portions are available for allocation. Alternatively, an accounting or a poling algorithm might be used to monitor memory use.

A memory management reference can take advantage of the fact that commercial memory devices are often divided into data blocks having a minimum or nominal size. For example, EPROM is nominally divided into N data blocks. At present, commercially available EPROM is divided into data blocks of 16 bytes per block, but EPROMs having 32 and 64 byte data blocks are readily foreseen. In the examples which follow, 16 bytes data blocks are assumed as a convenient granularity for the definition of read/write memory space.

Of critical importance, the reference by which the smart card memory is managed must always be accurate. Because smart cards are routinely used in financial transactions, they are constantly subjected to hacker attacks. In one class of favored attacks, generally referred to as "card yanks," a hacker will monitor the memory state of a smart card during critical periods of a financial transaction in which data is being written to the smart card. Within such periods, the memory may, in whole or in part, transition through an undefined state. Once potential periods of undefined memory state are identified, the hacker terminates the transaction during these periods in an attempt to acquire an undefined memory state, which will later be interrupted in a subsequent transaction as having a substantially higher value than that otherwise authorized had the interrupted transaction run to completion.

Accordingly, in one aspect, the present invention precludes such attacks by never allowing an erroneous or undefined memory state to arise from the memory management reference. Hereafter, this reference, in whatever form it is actually implemented, will be termed a "memory management record."

Within the present invention, the memory management record is preferably stored in RAM. RAM is preferred because it may be accessed (read to or written from) in a single data transfer cycle. (The exact timing for this cycle is defined by the microprocessor and the memory device used on the smart card). In contrast, read/write memory requires multiple cycles to write data, and is thus susceptible to card yanks. Other "fast" memory elements may be used to store the memory management record, such as the SRAM associated with the smart card microprocessor. However, single cycle data access is generally required to insure the accuracy and security of the memory management record.

Figure 3:
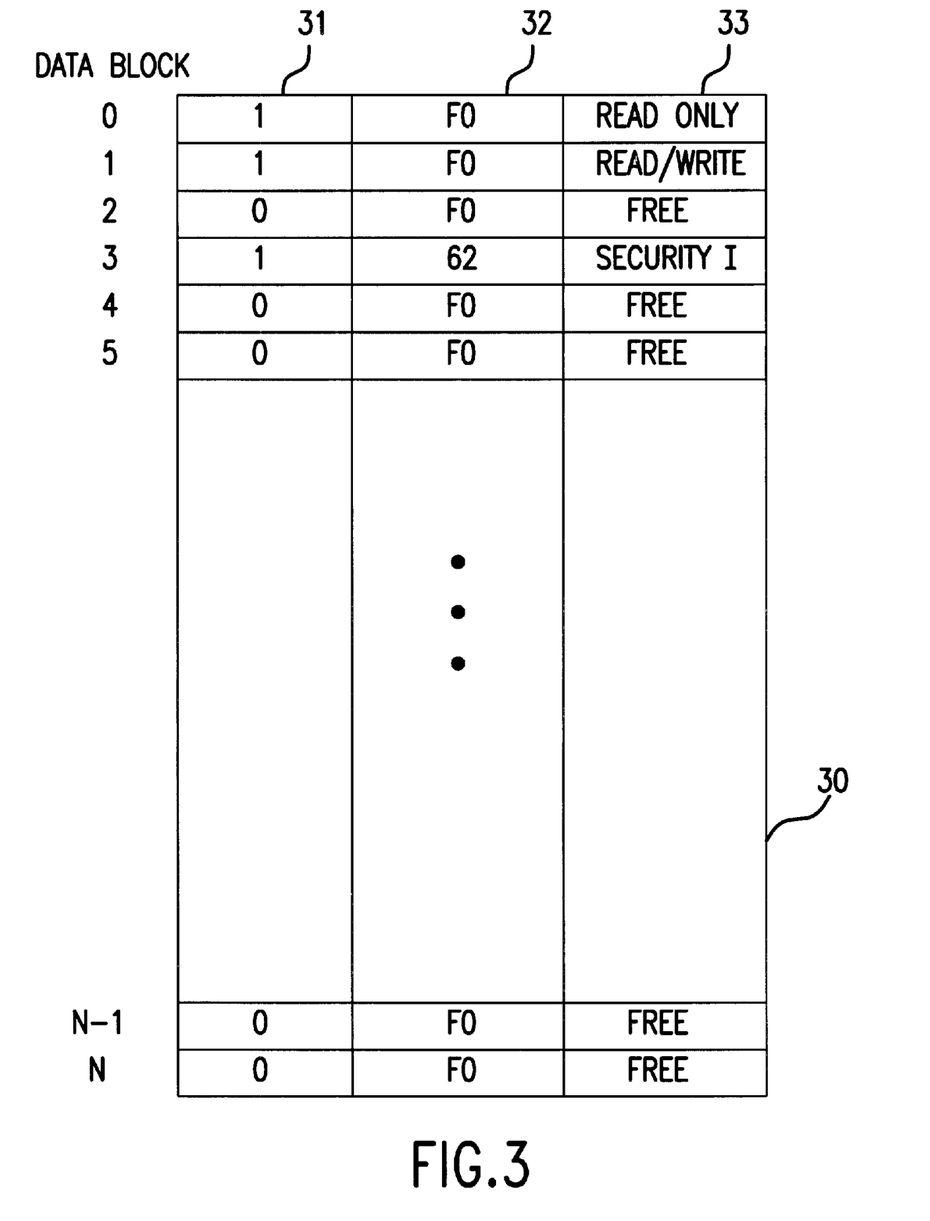
FIG. 3 illustrates one example of a memory management record according to the present invention.

The memory management record may take many forms. At present, a bitmap table is preferred, but a set of tables or an algorithm might also be used. Referring to FIG. 3, an exemplary bitmap table 30 is illustrated in three columns. Each column represents a data field having N entries. Each entry (0, 1, . . . N–1, N) corresponds to a data block within the read/write memory.

A first data field 31 includes N entries, each entry indicating whether an associated data block is currently in use. Use or non-use may be indicated by a single bit.

A second data field 32 also includes N entries. Each second data field entry indicates ownership for the associated data block. The term "ownership" denotes an access authorization or relationship between one or more smart card programs (the OS or an application) and the data block. That is, each entry in the second data field includes unique ownership information identifying which program(s) on the smart card are able to access the data block. For example, is assuming a single, 8-bit ownership byte, F0 might indicate that a data block is owned by the OS. Whereas, data block "3" in the example shown in FIG. 3 is owned by an application identified by the ownership byte "62." Use of a unique ownership byte for each data block prevents one application from accessing data owned by the OS or by another application. Of note, all data blocks not currently in use are typically defined as being owned by the OS.

A third data field 33 also includes N entries. Each entry in the third data field indicates an access type for the associated data block. The range of possible access types includes, for example, Read-Only, Read/Write, Lock, and Free. Further, the access type may indicate a security access condition for the data block.

The memory manager uses the memory management record to efficiently allocate, account for, and deallocate memory space. For example, when requiring additional memory space, the OS or an application will "call" the memory manager. The term "call" or "calling" is used throughout to broadly describe a relationship between two pieces of code in which one piece invokes the other. Once called, the memory manager receives a request for a block of read/write memory. Based on the size of the requested space, the present availability of read/write memory space, and the nature of the requesting program, the memory manager will allocate the requested space.

With benefit of the memory management record, memory allocation and deallocation are straight forward. Using the example illustrated in FIG. 3, the memory manager simply updates the information stored in the second (ownership) data field, and changes the use indicator in the first data field for each data block allocated/deallocated by a request. Further, the memory manager may monitor or account for memory space by interrogating the memory management record.

Referring to FIG. 3, it is assumed as an example, that the application having an ownership byte indication of "62" requested an additional 32 bytes of memory space. The memory manager determines to allocate data blocks 4 and 5, each block being 16 bytes in size, to fill the request. Accordingly, the memory manager changes the data in the first data field to indicate that data blocks 4 and 5 are now in use, and changes the ownership byte in the second data field from "F0," the ownership indicator for the OS, to "62," the application's unique ownership indicator. At this time, the memory manager might also change the access type indication in the third data field.

Memory space deallocation is similarly performed. Once data blocks in read/write memory are returned to OS ownership and their "not-in-use" status indicated, they may be reallocated during subsequent requests for memory space. In this manner, memory space may be intelligently and securely allocated and deallocated between the OS and any number of smart card applications.

The RAM-based, memory management record thus provides an ideal vehicle for the memory management. Since RAM is fast, the memory management record may be readily updated in a single access cycle to reflect any change in memory use, ownership, and/or access type for one or more read/write data blocks. Unfortunately, RAM is also a volatile memory incapable of retaining data when the smart card loses power. By their nature and use, smart cards often lose power. In fact, at the end of many transactions, a terminal will unceremoniously terminate power to the smart card without warning. Thus, the presence of a memory management record in volatile memory requires additional considerations.

In those circumstances where a terminal provides a "controlled shut-down," the memory management record may be easily preserved by copying it into read/write memory. Upon being subsequently reactivated, the memory management record will be recopied into RAM as part of a smart card initialization routine. A controlled shut-down is any transaction ending event which communicates the impending loss of power to the smart card with sufficient remaining time for the smart card to copy the memory management record into read/write memory. When copying the memory management record into read/write memory during a controlled shut-down, the OS may include a security signature with the file in order to authenticate the file before it is recopied into RAM during a subsequent transaction.

However, in those circumstances where power is terminated to the smart card without adequate notice or time to allow the smart card to copy the memory management record into read/write memory, i.e., following an "uncontrolled shut-down," the memory management record must be reconstructed from the data stored in the non-volatile read/write memory.

Thus, in another aspect of the present invention, reconstruction of the memory management record is performed during a subsequent initialization routine by the memory manager which draws upon information stored in non-volatile memory to accurately reconstruct the memory management record before the smart card memory is accessed. This ability or requirement to reconstruct a RAM-based memory management record from non-volatile memory implicates the nature and structure of the data records stored in read/write memory.

In order to properly reconstruct a memory management record, every relevant file, record, data object, or application must be stored in non-volatile memory in some form recognizable to the routine which reconstructs the memory management record. Only data stored in non-volatile memory survives a loss of power. Accordingly, all data intended to be "persistent" must be stored in non-volatile memory. For purposes of the explanation that follows, the non-volatile read/write memory element is assumed to be an EPROM. However, as previously noted, other types of non-volatile memory might be used.

A "data record" structure is defined for all data stored in read/write memory which is intended to be persistent. This structure is recognized by the memory manager which is able to recreate the memory management record following an uncontrolled shut-down. As one of ordinary skill will understand, the exact nature, size, and characteristics of the data record structure are left to the individual programmer. The example which follows is merely a presently preferred example.

Figure 4:
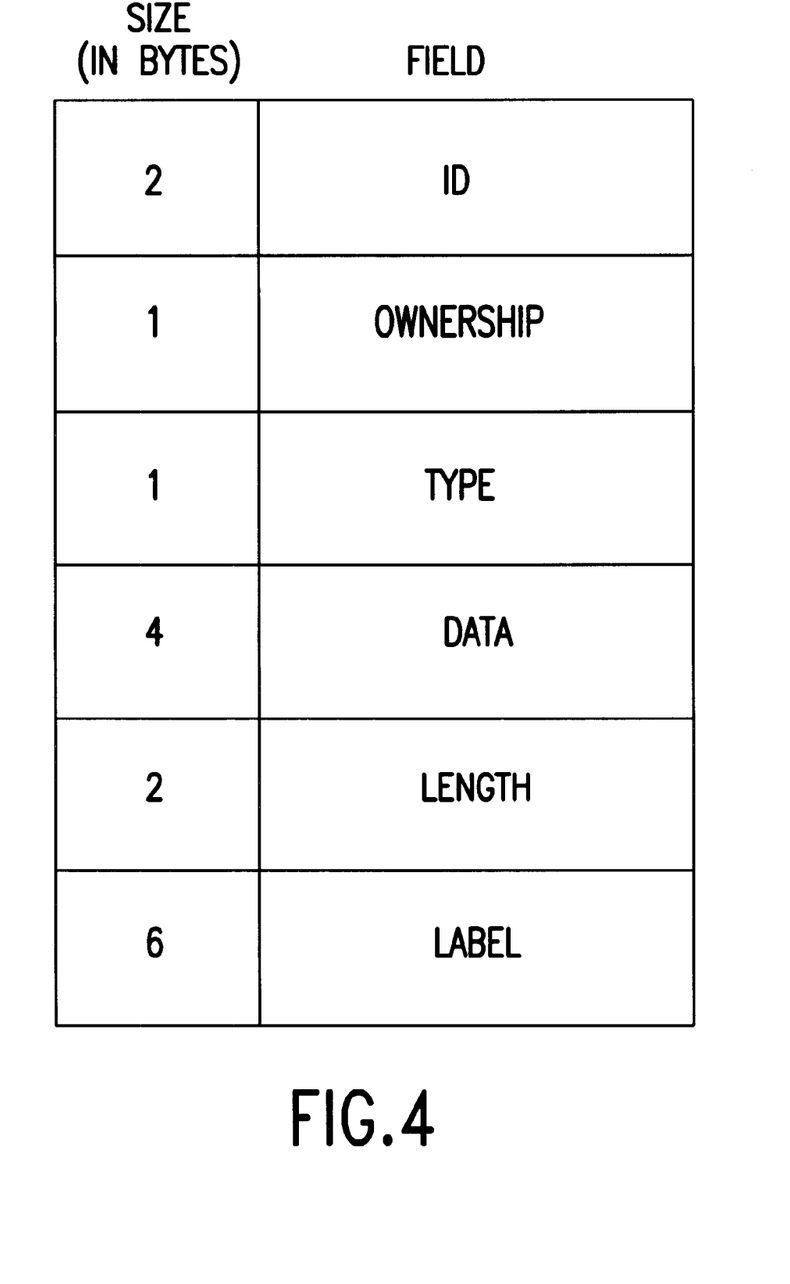
FIG. 4 illustrates one example of a data record format according to the present invention.

A data record may be an application, a file, a record, a data object or any other type of persistent data. FIG. 4 illustrates an exemplary 16-byte data record structure comprising a 2-byte ID field, a 1-byte ownership field, a 1-byte type field, a 4-byte data field, a 2-byte data length field, and a 6-byte label field. As presently preferred the type field and the label field are user definable. That is, an application's programmer may use these data record fields for any purpose whatsoever. The memory manager, and the OS in general, do not care what these fields contain. They are merely variable data fields associated with a data record. As examples, the type field might indicate whether the data record is an application, a file, or some other data object. The label field might indicate an access type or condition for the data record.

The ID field identifies the data record within the file system administered by the OS. The ownership field includes ownership information. In the present example, the ownership field of the data record contains the unique ownership byte previously described. Only the OS may access and define the ID and ownership fields in each data record.

The data field and the data length field are related within each data record. The data length field specifies the size of the data field. In one preferred embodiment, the data field is allocated 4 bytes, it's maximum data size. Thus, if the data length field indicates that the data is 4 bytes or less in size, then the data field stores the actual data associated with the data record. If, however, the data length field indicates that the data field is greater than 4 bytes in size, the data field stores a 4-byte data pointer indicating the beginning address, elsewhere in read/write memory at which the actual data may be found.

By interpreting these fields for each data record, the ownership, data length, and data fields in particular, the memory manager is able to reconstruct the memory management record from the data records stored in read/write memory.

The foregoing capability requires that all data records be stored or referenced within the read/write memory. As presently preferred, a smart card according to the present invention organizes and manages data records by use of a "file manager" in conjunction with one or more file directories. The file manager is another function resident in the OS, and may be called by the OS or by an application running on the smart card. The file manager provides general data record storage and retrieval services. The file manager often works in cooperation with the memory manager to accomplish a variety of tasks. In fact, one or ordinary skill will recognize that the functional partition between the file manager and the memory manager presented herein is arbitrarily drawn according to present preferences. These preferences relate to efficient program definition and clear programming explanation. The file manager, like all other OS functions in the present invention, may be implemented in many specific forms.

In order to understand the file manager and it's operative relationship to the memory manager and the memory management record, one must first determine or define a file management reference. A table or tree defining a file directory is presently preferred as a file management reference but other programming devices might be used.

Figure 5:
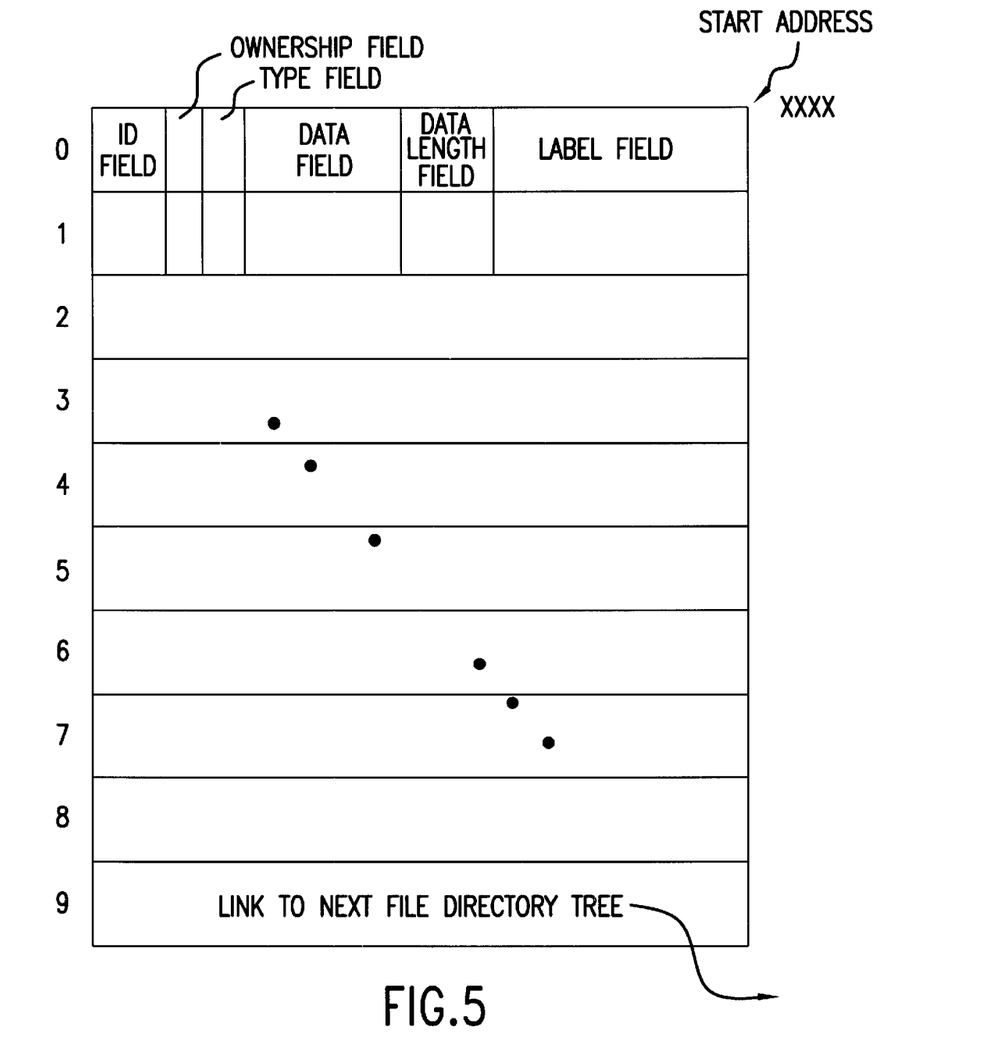
FIG. 5 illustrates one example of a file directory structure according to the present invention.

FIG. 5 illustrates a file directory. The file directory comprises N entries. Ten are shown as an example. Each entry is able to store a 16 byte data record having the structure previously described. Thus, beginning at some starting address, which may be defined within the OS or by some global variable upon first initialization of the smart card, a first (or root) file directory is created in read/write memory. In other words, upon first activating the smart card, the OS or a boot-program application stored in ROM creates a 160 byte long root file directory in read/write memory before the OS or an application defines a first data record.

Once the root file directory is created, the file manager stores the first N−1 data records defined on the smart card as the first N−1 entries. If an Nth data record is required, the root file directory is linked to a second file directory in read/write memory via a "LINK" data record stored as the Nth entry of the root file directory. Prior to the moment in which an Nth data record is stored, the Nth entry of the root file directory contains a "END" data record. The END data record indicates that no additional data records are stored in read/write memory. In contrast, the LINK data record directs the file manager to another file directory. Any number of file directories may be linked in this manner to accommodate a large number of data records.

END and LINK are special types data records which are used by the file manager to effectively interrogate and manage file directories in read/write memory. The ID or type data fields in the END and LINK data records may be used to indicate their special nature to the file manager. For the LINK data record, the data field may be used to store a pointer to the beginning address of the next file directory and the data length field will indicate the data length—160 bytes in the working example. Accordingly, in one embodiment, the OS will always own the Nth entry of each file directory, which will contain either an END data record or a LINK data record.

Thus, at the moment that some program on the smart card seeks to define an Nth data record, the file manager calls the memory manager requesting allocation of another 160 bytes of read/write memory. Once allocated by the memory manager, the 160 bytes are defined as a second file directory, and the starting address of the second file directory is linked to the root file directory by changing the Nth entry of the root file directory from an END data record to a LINK data record, and by storing the starting address for the second file directory in the data field of the LINK data record.

File directories may be searched or queried by the file manager. That is, the file manager may search a file directory using any one or more of the data record fields. Thus, a specific data record may be located by searching for its ID field, or all data records owned by a particular application may be readily located by their ownership field. By using the type field and/or the label field, for example, an application developer may define a specific record access mechanism based on a unique security requirement in the application. Such a mechanism may then be implemented and controlled using the file manager.

Figure 6:
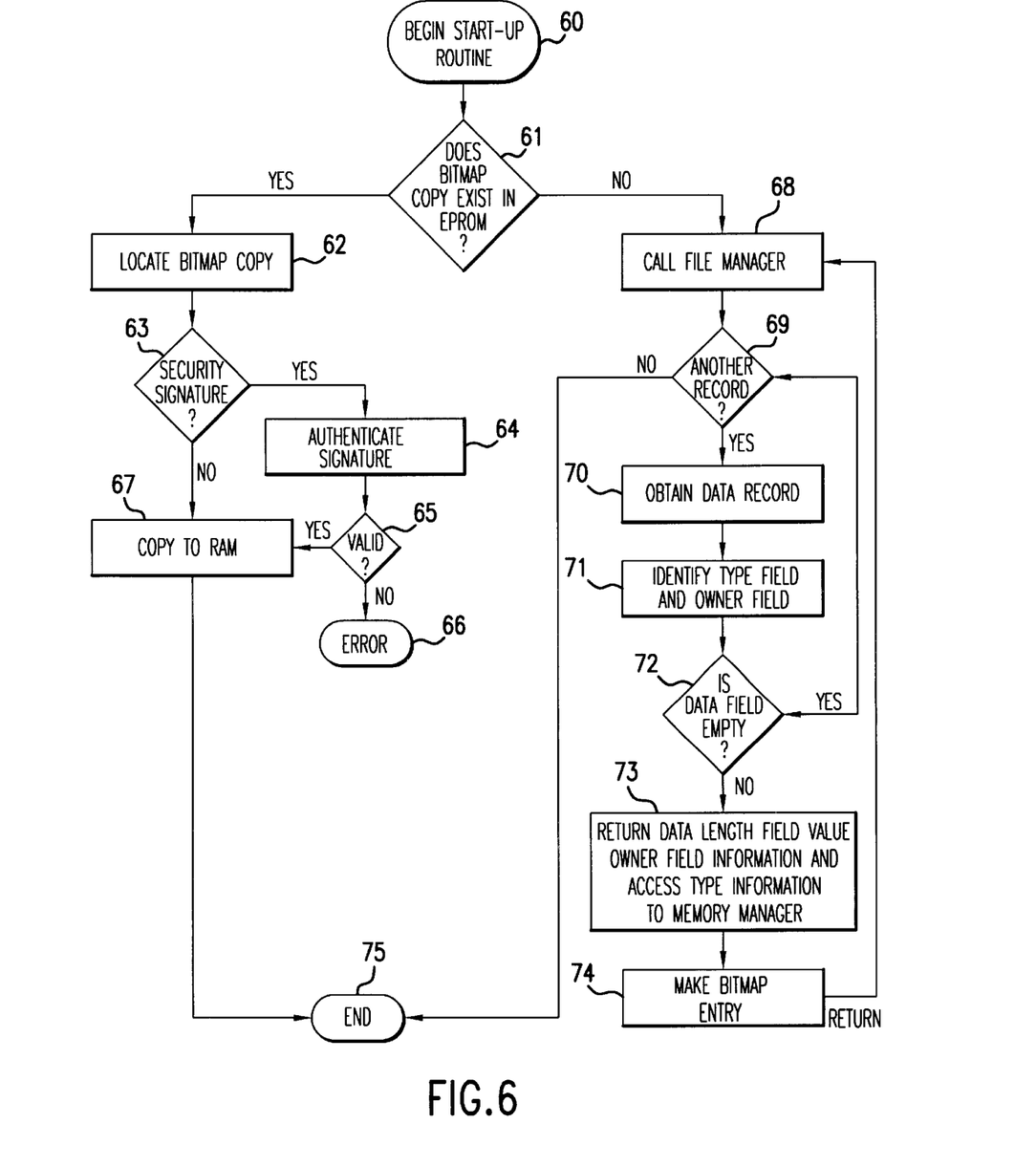
FIG. 6 is a flowchart illustrating a method for forming a memory management record in RAM upon smart card initialization.

With an understanding of the preferred data record structure and the file manager, the formation of the memory management record, in this example a bitmap according to FIG. 3, by the memory manager will now be explained with reference to the flowchart shown in FIG. 6.

Upon receiving power, the smart card begins a start-up routine 60. As with conventional smart cards, the start-up routine may begin with receipt of a RST signal from the terminal. At some point in the start-up routine, an ATR signal is returned to the terminal. However, before beginning an I/O routine to receive a command from the terminal, the smart card must form the bitmap in RAM. Since the smart card may have shut-down in either a controlled or uncontrolled manner at the end of the previous transaction, the memory manager must determine whether a copy of the previous sessions bitmap is stored in EPROM (61=yes). The presence of a stored bitmap might be indicated by the state of a global variable in EPROM which is interrogated during the start-up routine.

If a bitmap copy is stored in EPROM, the copy is located 62. If the bitmap copy includes a security signature (63=yes), the signature is authenticated 64, and if the signature is valid (65=yes), the bitmap copy is stored in RAM 67 and the routine is ended 75. If, however, the signature is not valid (65=no), the start-up routine is halted and an error message 66 is returned to the terminal. If the bitmap copy does not include a security signature (63=no), it is simple stored in RAM 67 and the routine is ended 75.

If a copy of the previous session's bitmap is not stored in EPROM (61=no), the memory manager must recreate the bitmap from the data records stored in EPROM. To do this, the memory manager calls the file manager 68, and the file manager begins with the first entry in the root file directory and obtains a data record 70. The ownership and type fields are identified from the obtained record 71.

Next, the file manager determines whether the data field is empty 72. This determination may be made on the basis of the contents of the type field, or by directly examining the data field, or the data length field. If the data field is empty (72=yes), then the file manager determines whether another data record is present 69. This determination may be made by reading the next data record in the root file directory to see if it is an END data record. Once an END data record is found, the bitmap formation routine ends 75.

If, however, the data field is not empty (72=no), the data length field value, the ownership field information, and the access type information are returned to the memory manager 73. The memory manager then writes this information to RAM as one bitmap entry 74. The memory manager again calls the file manager 68 and the process continues until the END data record is found.

Using this routine, the three data fields of the bitmap shown in FIG. 3 may be created in RAM. More or less information may be transferred from the data records to the memory management record depending on the nature and content of the memory management record.

Figure 7:
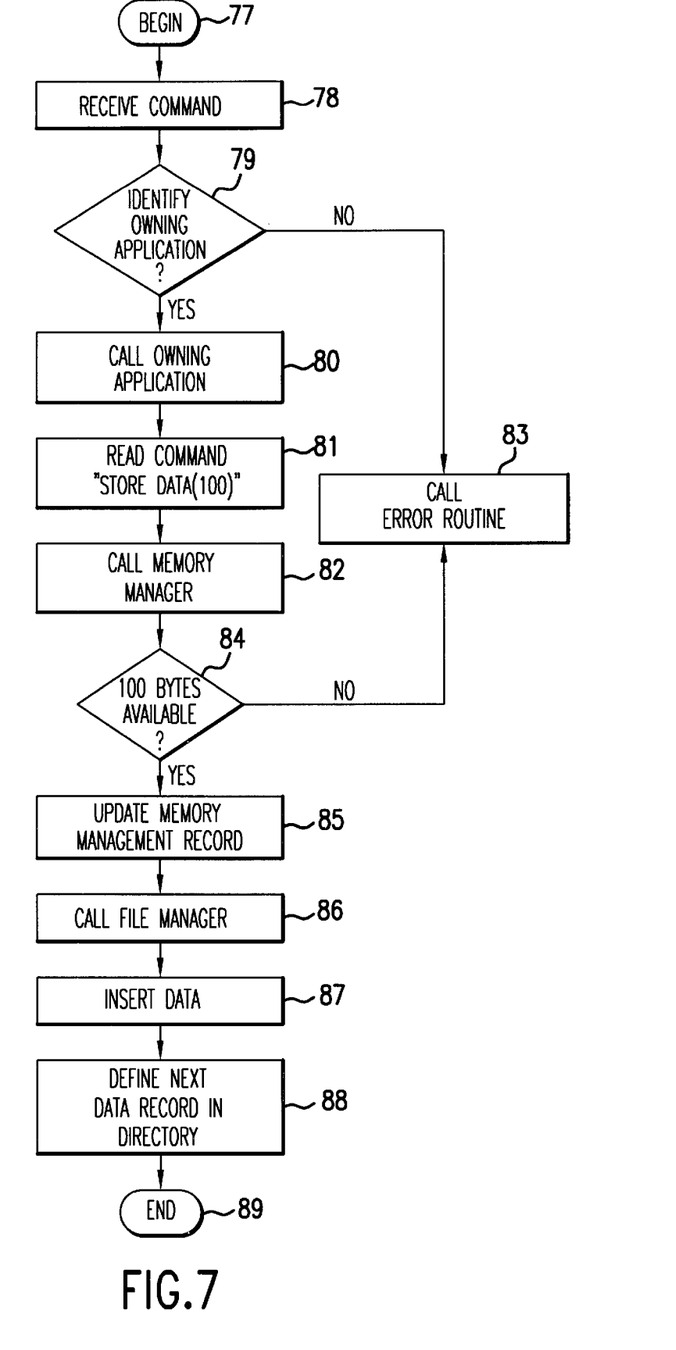
FIG. 7 is a flowchart illustrating a method for allocating memory and forming a data record in the file directory; and, FIG. 8 is a flowchart illustrating a method for deleting a data record from the file directory and deallocating the associated memory.

An exemplary routine by which a new data record is formed is explained below with reference to the flowchart in FIG. 7. In this example, it is assumed that the smart card has been successfully activated. Accordingly, a file directory in stored in EPROM, a memory management record has been formed in RAM, and the smart card ready to receive a terminal command.

While in this BEGIN state 77, a command is received 78. Preferably, the OS controls the I/O routine, and upon receiving a command the OS seeks to identify the application owning the received command 79. This might be done by comparing an ownership byte communicated in the command with the ownership byte for each application type data record stored in the file directory. The type data field of the data record stored in the file directory can be used to readily indicate which data records which are applications. If failing to identify an owning application (79=no), the OS will call an error routine to identify the failure to the terminal 83.

After identifying the owning application (79=yes), the OS will call this application and communicate the command 80. In this example, the application receives a command to "Store Data," where the data to be stored is 100 bytes in size 81. In order to store the data, the application must first be allocated sufficient memory space by the memory manager. Thus, the application calls the memory manager 82.

If the memory manager fails to identifies 100 bytes of available space (84=no), the error routine is called to indicate this fact to the terminal 83. Assuming the memory manager identifies 100 available bytes of memory, the memory management record is updated to allocate the space to the requesting application 85.

The file manager is called 86, and inserts the data into the allocated memory space in order to create the requested data record 87. The file manager then defines the appropriate data fields in the next available file directory entry to reflect the nature of the new data record 88. At this point, the new data record is persistent in memory, and the OS ends the routine 89.

Data records may be deleted for any number of reasons. For example, an application might be wholly deleted from the smart card taking every associated data record with it. Some data records may be time sensitive. That is, some data records may be valid for only a limited period of time, or a limited number of transactions. Once the time period or other condition expires the data record is deleted.

No matter what the reason, an existing data record may be deleted and its associated memory space deallocated and returned to the OS for future use. In this manner, memory space is actually recycled within the smart card of the present invention.

Figure 8:
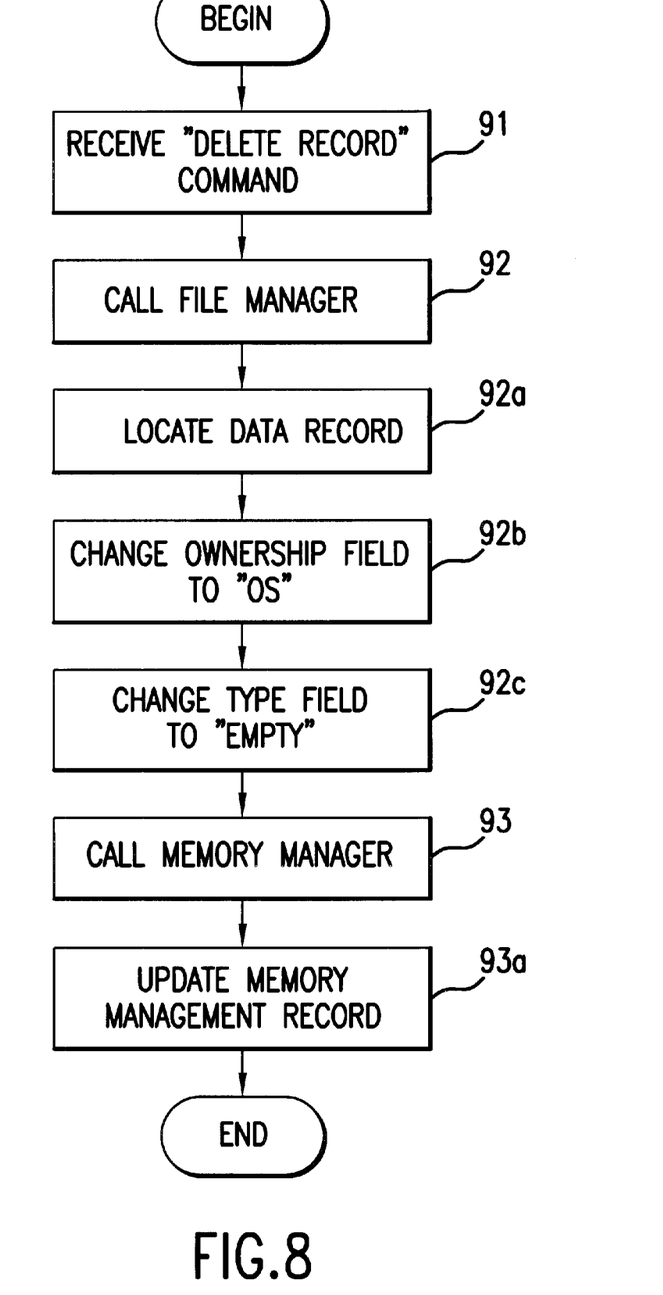

An exemplary routine by which a data record is deleted is explained with reference to FIG. 8. It is assumed that an application has received from the terminal via the OS a "Delete Record" command 91. Alternatively, a "Delete Record" request might result from some other terminal command being implemented in an application. In any event, upon receiving a "Delete Record" command, the application calls the file manager 92.

The file manager locates the data record in the file directory by, for example, looking for a specific ID field 92a, changes the information in the ownership data field for the located data record from its present state to one indicating OS ownership 92b, and changes the type field of the located data record to indicate that the associated file directory entry in now empty 92c.

Once the file manager is done, the memory manager is called 93. The memory manager updates the memory management record 93a to reflect the deallocation of memory space previously associated with the deleted data record. For example, taking the bitmap example of FIG. 3, for each data block once allocated to the deleted data record, the first data field is changed to indicate "not in use," the second data field is changed to indicate OS ownership, and any type access information in the third data field is cleared to indicate "free' access.

Using the principles and relationships above, a memory manager and a file manager used in conjunction with a memory management record and one or more file directories may efficiently allocate, account for, and deallocate memory space in an environment where integrity of the memory at any moment is ensured. As used above, the file manager and the file directory replace the unwieldy file tree structure suggested by ISO 7816, part 4. Scarce memory space may be recycled for use by the smart card.

In sum, the present invention provide a platform upon which a smart card may download and run a multiplicity of applications from different sources, without beaching data security between the applications, and without inefficiently partitioning memory according to application.

The foregoing examples have been presented to teach the novel nature and relationships between at least the smart card operating system, the memory manager, the file manager, the memory management record, one or more file directories, and applications running on the smart card. By its very nature, software development yields a great varieties of variations and resulting structures. With this in mind, the present invention is not limited to the examples above, but is defined by the attached claims.

What is claimed is:

1. A system managing smart card memory, the memory comprising a a Random-Access-Memory (RAM) and a Read/Write (R/W) memory, and the system comprising:

memory management record stored in RAM during smart card operation, and indicating memory allocation and use of the R/W memory.

2. The system of claim 1, wherein upon controlled shut-down of the smart card a copy of the memory management record is copied from RAM to R/W memory, and upon subsequent reactivation of the smart card, the memory management record is copied from R/W memory into RAM.

3. The system of claim 2, wherein a security signature authenticating the memory management record is also stored in R/W memory following a controlled shut-down.

4. The system of claim 1, wherein the R/W memory contains at least one data record, and wherein upon activation of the smart card following an uncontrolled shut-down, the memory management record is created in RAM by reference to the at least one data record stored in R/W memory.

5. The system of claim 1, wherein R/W memory is divided into N data blocks, and wherein the memory management record comprises a bitmap table stored in RAM and having N entries, each one of the N entries comprising a first data field, and each one of the N entries in the first data field indicating current use for a corresponding one of the N data blocks in R/W memory.

6. The system of claim 5, wherein each one the N entries in the first data field comprises a single bit indicating whether or not the corresponding one of the N data blocks is currently allocated for use.

7. The system of claim 5, wherein each one of the N entries in the bitmap table further comprises:

a second data field indicating ownership of a corresponding one of the N data blocks of R/W memory.

8. The system of claim 7, wherein each one of the N entries the bitmap table further comprises:

a third data field indicating an access control status for a corresponding one of the N data blocks of R/W memory.

9. The system of claim 8, wherein the access control status defines at least one state from a group of states consisting of free access, read/write access, and read-only access.

10. A method of managing a smart card memory, the memory comprising a a Random-Access-Memory (RAM) and a Read/Write (R/W) memory, and the method comprising:

during operation of the smart card, storing a memory management record in RAM which indicates memory allocation and use of the R/W memory, and allocating space in the R/W memory by reference to the memory management record stored in RAM.

11. The method of claim 10, wherein the memory further comprises a Read-Only-Memory (ROM), and the method further comprising:

storing at least one application and an operating system (OS) primarily in ROM, wherein the OS comprises a memory manager solely capable of allocating read/write memory space; and, storing at least one data record associated with the at least one application in R/W memory.

12. The method of claim 11, wherein a first transaction between the smart card and a terminal may be terminated by either a controlled shut-down or an uncontrolled shut-down, the method further comprising:

upon terminating the first transaction in a controlled shut-down, copying the memory management record from RAM to R/W memory.

13. The method of claim 12, further comprising:

storing a security signature authenticating the copy of the memory management record in R/W memory.

14. The method of claim 13, wherein upon beginning a second transaction between the smart card and a terminal, the second transaction following termination of the first transaction, the method further comprises:

determining whether a copy of the memory management record is present in R/W memory;

upon determining that a copy of the memory management record is present in R/W memory, authenticating the stored security signature; and, upon successful authentication the security signature, copying the memory management record from R/W memory into RAM.

15. The method of claim 12, wherein upon beginning a second transaction between the smart card and a terminal, the second transaction following termination of the first transaction, the method further comprises:

determining whether a valid copy of the memory management record is present in R/W memory, and upon determining that a valid copy of the memory management record is present in R/W memory, recopying the memory management record into RAM.

16. The method of claim 12, wherein upon beginning a second transaction between the smart card and a terminal, the second transaction following termination of the first transaction, the method further comprises:

determining whether a valid copy of the memory management record is present in R/W memory, and upon determining that a valid copy of the memory management record is not present in R/W memory, creating a memory management record in RAM by reference to the at least one data record.

17. A method of managing memory in a smart card, the smart card comprising a microprocessor and a memory, the memory comprising Random-Access-Memory (RAM), Read/Write (R/W) memory divided into N data blocks, and Read-Only-Memory (ROM), and the method comprising:

defining in RAM a memory management record having a first data field of N entries, each one of the N entries in the first data field indicating for a corresponding one of the N data blocks in R/W memory, whether the corresponding one of the N data blocks in R/W memory has been allocated for use.

18. The method of claim 17, wherein an Operating System (OS) is stored primarily in ROM, wherein the memory management record further comprises a second data field of N entries, each one of the N entries in the second data field indicating ownership for a corresponding one of the N data blocks of R/W memory, and wherein every one of the N data blocks not owned by an application is owned by the OS.

19. The method of claim 18, wherein the memory management record further comprises a third data field of N entries, each one of the N entries in the third data field indicating an access control status for a corresponding one of the N data blocks of R/W memory.

20. In a smart card comprising a microprocessor and a memory, the memory storing an operating system (OS) and at least one application, the OS comprising a file system and the memory storing a data record, the data record comprising:

an identification (ID) field uniquely identifying the data record within the file system;

an ownership field identifying at least one owner for the data record;

a type field defining the nature of the data record within the file system;

a data field, and a data length field;

wherein the data length field specifies the size of data associated with the data record, and the data field stored the data when the data is of a size not greater than a maximum data size; and wherein the data field stores a pointer to the data when the data is of a size greater than the maximum data size.

21. A method of managing memory in a smart card comprising a microprocessor and a memory, the memory comprising a volatile memory portion and a non-volatile memory portion, the non-volatile memory portion storing at least one application, an operating system, and a plurality of data records associated with the at least one application, the method comprising:

upon activating the smart card, forming a memory management record in the volatile memory portion by reference to the plurality of data records.

22. The method of claim 21, wherein the non-volatile memory portion is divided into N data blocks, and wherein each one of the plurality of data records comprises an ownership field containing ownership information for the data record, and a data length field indicating the size of data associated with the data record, the method further comprising:

interrogating each one of the plurality of data records, and for each data record;

defining the first data field in the memory management record in accordance with the data length field of data record; and defining a second data field in the memory management record in accordance with the ownership field of the data record.

23. The method of claim 22, wherein the data records are arranged in a file directory stored in the non-volatile memory portion.

24. The method of claim 23, wherein the file directory comprises M entries, each one of the M entries capable of storing a data record or an END data record.

25. The method of claim 24, wherein interrogating each one of the data records further comprises: traversing the file directory entry by entry until finding an END data record.

26. The method of claim 25, wherein the file directory comprises a root file directory and at least one additional file directory, wherein each one of the M entries is further capable of storing a LINK data record, such the root file directory and the at least one additional file directory are linked in memory by a LINK data record.

27. A method of managing memory in a smart card comprising a microprocessor and a memory, the memory comprising a volatile memory portion and a non-volatile memory portion, the non-volatile memory portion storing at least one application, an operating system, and a plurality of data records associated with the at least one application, and the method comprising:

upon activating the smart card, forming a memory management record in the volatile memory portion by interrogating each one of the plurality of data records; and for each one of the plurality of data records, defining a first data field in the memory management record in relation to the size of the data record.

28. The method of claim 27, wherein the non-volatile memory portion is divided into N data blocks, wherein the first data field comprises N entries, each entry corresponding to one of the N data blocks, and wherein the step of defining the first data field in the memory management record further comprises:

defining one or more of the N entries in the first data field in response to an indication of data size for each one of the plurality of data records.

* * * * *